United States Patent [19]
Van den Boogaart et al.

[11] 3,869,486
[45] Mar. 4, 1975

[54] IMPROVED MANGANESE ETHYLENE BISDITHIOCARBAMATE COMPOSITION

[75] Inventors: Krijn Van den Boogaart; Meelis Nicolaus Louis, both of Vlaardingen, Netherlands

[73] Assignee: Penwalt Corporation, Philadelphia, Pa.

[22] Filed: July 16, 1973

[21] Appl. No.: 379,692

[30] Foreign Application Priority Data
July 18, 1972 Netherlands.................. 7209992

[52] U.S. Cl. ....... 260/429 K, 260/429.9, 260/438.1, 260/439 R, 424/286, 424/287, 424/289, 424/294, 424/295
[51] Int. Cl. ............................................. C07f 13/00
[58] Field of Search .................. 260/429 K, 429 R

[56] References Cited
UNITED STATES PATENTS

| | | | |
|---|---|---|---|
| 2,855,418 | 10/1958 | Mugnier......................... | 260/429 K |
| 3,082,229 | 3/1963 | Nash.............................. | 260/429 K |
| 3,085,042 | 4/1963 | Luginbuhl...................... | 260/429 K |
| 3,210,395 | 10/1965 | Nemec et al.................. | 260/429 K |
| 3,259,643 | 7/1966 | Nash.............................. | 260/429 R |
| 3,379,610 | 4/1968 | Lyon et al...................... | 260/429 R |
| 3,499,018 | 3/1970 | Stevenson...................... | 260/429 R |
| 3,523,960 | 8/1970 | Lehureau........................ | 260/429 K |

FOREIGN PATENTS OR APPLICATIONS
1,220,518   1/1971   Great Britain

*Primary Examiner*—Arthur P. Demers

[57] ABSTRACT

An improved, more stable fungicidal composition containing maneb (manganese ethylene bisdithiocarbamate) is produced by contacting in aqueous solution a water-soluble manganese salt with an excess of water-soluble salt of ethylene bisdithiocarbamic acid, and contacting the resulting aqueous medium suspension of maneb precipitate and solution of water-soluble salt of ethylene bisdithiocarbamic acid with a stoichiometric excess of a watersoluble salt of zinc, and separating the resulting diprecipitate product from the aqueous medium.

16 Claims, No Drawings

IMPROVED MANGANESE ETHYLENE BISDITHIOCARBAMATE COMPOSITION

The invention relates to a process for the preparation of manganese ethylene bisdithiocarbamate (maneb) products containing still other metals and to fungicidal compositions containing such products.

In the U.S. Pat. specification No. 3,379,610 a process has been described in which metal complexes of the maneb with other metal ions would be formed. In this process e.g. a manganese salt, such as manganese chloride or manganese sulfate, is reacted with an equimolar amount of disodium or diammonium ethylene bisdithiocarbamate, whereafter the resulting maneb precipitate is washed and mixed with a solution of at least one water soluble salt of zinc, cobalt, iron and/or copper. When zinc is used 0.1–7 percent of zinc ion, when copper is used 0.2–2.5 percent of copper ion, when iron is used 0.1–10 percent of ferric ion or 1–50 percent of ferrous ion respectively and when cobalt is used 0.25–10 percent of cobalt ion, based on maneb, are used.

According to the U.S. Pat. specification No. 3,210,394 complexes of manganese salts and other metal salts of ethylene bisdithiocarbamic acid are obtained by simultaneously mixing calculated amounts of water soluble manganese salts and salts of other metals with an aqueous solution of a water soluble salt of ethylene bisdithiocarbamic acid.

Furthermore it is known from the U.S. Pat. specification No. 3,082,229 to convert water soluble salts of ethylene bisdithiocarbamic acid stepwise with water soluble metal salts to form bimetallic salts, which are insoluble in water. In this process, first half of the stoichiometrically required amount of metallic salt was contacted with the water soluble salt of ethylene bisdithiocarbamic acid, the non desired precipitate was filtered off and the filtrate was subsequently contacted with the other half of the calculated amount of metal salt.

In the published Dutch Pat. application No. 68.10949 the preparation of maneb has been described, which product is covered with a water insoluble metal ethylene bisdithiocarbamate, e.g. with zinc ethylene bisdithiocarbamate (zineb). This zineb is precipitated as it were on the elementary maneb grains, which are suspended in water. The number of moles of zineb per mole of maneb may vary of from 0.01 to 9 moles.

According to the published Dutch Pat. application No. 68.10950 maneb is combined with cuprous ethylene bisdithiocarbamate, either by coprecipitation or by addition of a soluble cuprous salt and sodium ethylene bisdithiocarbamate to a maneb suspension of maneb paste.

Finally it is known from the U.S. Pat. specification No. 3,085,042 to prepare fungicidal compositions containing 5–95 percent by weight of maneb and 0.25–5 mole percent, based on the maneb, of a zinc or cadmium compound. The maneb and the water soluble zinc or cadmium salts can be brought together in any convenient fashion, e.g. by dry mixing of maneb filter cake with zinc or calcium salts or by washing the maneb filter cake with an aqueous solution of a zinc or cadmium salt.

It has now been found that a maneb product containing still other metals which form water insoluble salts with ethylene bisdithiocarbamic acid, having a better chemical stability, a good fungicidal action and a lower phytotoxicity are obtained by the process of the invention which is characterized by adding to the aqueous reaction medium obtained by the treatment of an aqueous solution of a water soluble salt of ethylene bisdithiocarbamic acid with a water soluble manganese salt, in which treatment a maneb precipitate is formed, and containing a water soluble salt of ethylene bisdithiocarbamic acid, the water soluble salt of the other metal in a stoichiometric excess with respect to the water soluble salt of ethylene bisdithiocarbamic acid and recovering the resulting precipitate together with the maneb precipitate.

When an aqueous solution of a water soluble salt of ethylene bisdithiocarbamic acid is treated with a water soluble manganese salt a maneb suspension is formed. According to the invention in general this maneb suspension is prepared by adding to an aqueous solution of a salt of ethylene bisdithiocarbamic acid a water soluble manganese salt in an amount which is below the stoichiometric amount with respect to the ethylene bisdithiocarbamic acid salt. As a salt of ethylene bisdithiocarbamic acid preferably the sodium salt (nabam) or the ammonium salt (ambam) are used; manganese (II) sulfate and manganese (II) chloride are preferred manganese salts. To the resulting maneb suspension, which in addition to the water soluble byproducts formed also contains water soluble salt of ethylene bisdithiocarbamic acid, a stoichiometric excess of the water soluble salt of the other metal, such as zinc, cobalt, copper, nickel or iron chloride or sulfate, is added. The resulting precipitate is then separated from the liquid, e.g. by filtration or centrifuging. In general the solid substance thus separated will be washed and dried. With the resulting substance fugicidal compositions can be prepared. However, it is also possible to precipitate maneb in an aqueous medium with the aid of equimolar amounts of manganese salt and water soluble ethylene bisdithiocarbamate and to add to the resulting reaction mixture successively a water soluble salt of ethylene bisdithiocarbamic acid and a water soluble salt of the other metal.

Finally it is also possible to filter the maneb suspensions prepared in the above ways, to add to the filtrate in an arbitrary sequence the water soluble salt of the other metal and, if necessary, water soluble salt of ethylene bisdithiocarbamic acid, whereafter either the maneb which has been filtered off, is added and this is filtered together with the precipitate resulting from the reaction carried out in the filtrate or the precipitate resulting from this reaction is filtered and combined with the filtered maneb, whereafter fungicidal compositions may be prepared with the combined precipitates. It is also possible to wash each of both precipitates, before they are combined, while also the combined precipitates may be washed and dried. The products obtained according to the several embodiments of the process of the invention are substantially identical and all show the abovementioned improved properties.

In general the amount of manganese salt used is 0.90–0.99 mole and particularly 0.94–0.97 mole per mole of the water soluble salt of ethylene bisdithiocarbamic acid used as the starting material. The amount of the water soluble salt of the other metal is in general 0.01–25 moles, preferably 2–25 moles and particularly 4–6 moles per mole of the water soluble salt of ethylene bisdithiocarbamic acid present in the reaction medium. The amounts of both lastmentioned salts are dependent on the amounts of the manganese salts used in order to obtain those ratios of the metals in the final compositions, which are the optimum for each purpose. These optimum ratios are known as such from the U.S. Pat. specification Nos. 3,210,394 and 3,379,610. Thus the optimum ratio of manganese to the preferred zinc, based on maneb and zineb (= zinc ethylene bisdithiocarbamate) is 7:1 to 7:0.9. Besides zinc also cobalt, nickel, iron, copper etc. may be used.

The products prepared according to the invention may be manufactured into fungicidal compositions in the usual way, e.g. by mixing them with a solid and/or liquid carrier, in the presence or in the absence of one or more usual ingredients of fungicidal compositions, such as emulsifying agents, dispersing agents and/or wetting agents. Stabilizers for the maneb may also be incorporated into the compositions.

The following examples illustrate the invention.

EXAMPLE I

A. To a 40 percent by weight aqueous solution of ammonium ethylene bisdithiocarbamate (ambam), which contained in total 1.445 moles of ambam, 3400 ml. of a solution were added, which contained in total 1.40 moles of manganese sulfate. The resulting mixture was stirred for 10 minutes, whereafter 100 ml. of an aqueous zinc chloride solution were added, which contained in total 0.18 mole of zinc chloride. After stirring for another five minutes the resulting precipitate was filtered, washed and dried. 400 g. of product were obtained. The content, determined according to the method described in the CIPAC Handbook; volume I (1970), page 464, was 89.3 percent, the yield was 91.2 percent.

B. To a 40 percent by weight aqueous solution of ammonium ethylene bisdithiocarbamate, which contained in total 1.40 moles of ambam, 3400 ml. of a solution were added, which contained in total 1.40 moles of manganese sulfate. The resulting mixture was stirred for 10 minutes, whereafter successively 0.045 mole of ambam as a 40 percent by weight aqueous solution and 100 ml. of an aqueous zinc chloride solution containing in total 0.18 mole of zinc chloride, were added. After stirring for another five minutes the resulting precipitate was filtered, washed and dried. 399 g. of product were obtained. The content was 89.2 percent, the yield was 90.8 percent.

C. To a 40 percent by weight aqueous solution of ammonium ethylene bisdithiocarbamate, which contained in total 1.445 moles of ambam, 3400 ml. of a solution were added, which contained in total 1.40 moles of manganese sulfate. The resulting mixture was stirred for 10 minutes, whereafter the precipitate maneb was filtered and washed with a small quantity of water. To the combined filtrate and wash water 100 ml. of an aqueous zinc chloride solution were added, which contained in total 0.18 mole of zinc chloride. After 5 minutes of stirring the maneb filter cake was added to the resulting suspension. After stirring for another ten minutes the maneb product was filtered, washed and dried. 400 g. of a product were obtained. The content was 89.5 percent, the yield was 91.3 percent.

In the products obtained the amounts of manganese and zinc were determined complexometrically. The amounts found were calculated as maneb and zineb (= zinc ethylene bisdithiocarbamate) and expressed in the molar ratio maneb:zineb is 70:x. The results are shown in table A.

In table A also the results of stability tests have been indicated, which have been carried out with the products obtained in the above way and with a physical mixture (PM—1) of maneb and zineb in a molar ratio of 70:9. In these stability tests two different methods have been followed:

a. 10 g. product or mixture were stored in the air for 200 hours at 90°C;
b. 20 g. product or mixture were stored for 14 days under a pressure of 25 g/cm$^2$ at 54°C, as described in the CIPAC Handbook, volume I (1970), page 951.

The contents after these stability tests were again determined according to the method described in the CIPAC Handbook, volume I (1970), page 464.

For the sake of comparison also a product (CP—1) has been tested, which are prepared as follows:

CP—1.

To 3400 ml. of an aqueous solution containing 1.40 moles of manganese sulfate and 0.18 mole of zinc chloride 1.58 moles of ambam were added in the form of a 40 percent by weight aqueous solution. The coprecipitated manganese-zinc-ethylene bisdithiocarbamate was filtered, washed and dried (process according to the U.S. Pat. specification No. 3,210,394). Content of the product 86.0 percent; yield 83.1 percent.

TABLE A

| Product | | maneb:zineb | decrease of content in % | |
|---|---|---|---|---|
| | | | a | b |
| Example | IA | 70 : 9.4 | 8.9 | 2.7 |
| | IB | 70 : 9.3 | 8.8 | 2.7 |
| | IC | 70 : 9.4 | 8.7 | 2.6 |
| PM-1 | | 70 : 9.0 | 10.8 | 3.9 |
| CP-1 | | 70 : 9.1 | 19.6 | 5.3 |

The products according to the invention have the best stability

EXAMPLE II

The examples IA, Ib and IC were repeated with the proviso that 180 ml. of 1-molar zinc chloride solution were used in stead of 100 ml. 1.8-molar zinc chloride solution. With the resulting products the same determinations and tests have been carried out as indicated in example I. The products were compared with a physical mixture (PM—2) and three products CP—1 (vide example I), CP—2 and CP—3. The products CP—2 and CP—3 were prepared as follows:

CP—2.

To 3400 ml. of an aqueous solution containing 1.40 moles of manganese sulfate first 1.58 moles of ambam in the form of a 40 percent by weight aqueous solution in water and thereafter 180 ml. of 1-molar zinc chloride solution (0.18 mole of ZnCl$_2$) were added. The resulting precipitate was filtered, washed and dried.

CP—3.

In an aqueous suspension containing 10 percent by weight of maneb (prepared in a way known per se), which corresponds with 2.60 moles of manganese ethylene bisdithiocarbamate, an aqueous solution of zinc chloride, containing 0.22 mole of zinc chloride was introduced while stirring at a temperature between 10° and 25°C and at a pH between 3.5 and 7, while simultaneously an aqueous solution containing 0.20 mole of sodium ethylene bisdithiocarbamate was added. The reaction mass was filtered, washed with water several times and dried (process according to the published Dutch Pat. application No. 68.10949).

The results of the determination and tests with these products are shown in table B, from which it appears that products of example II have the best stability.

Table B

| Product | maneb:zineb | content % | yield % | decrease of content in % | |
|---|---|---|---|---|---|
| | | | | a | b |
| Example IIA | 70 :9.3 | 89.5 | 94.1 | 7.0 | 2.4 |
| IIB | 70 :9.1 | 89.4 | 93.5 | 7.1 | 2.4 |
| IIC | 70 :9.3 | 89.6 | 94.4 | 6.6 | 2.1 |
| CP-1 | 70 :9.7 | 85.6 | 83.3 | 25.6 | 6.3 |
| CP-2 | 70 :10.6 | 87.7 | 84.1 | 7.3 | 3.1 |
| CP-3 | 70 :6.1 | | | 7.5 | 3.7 |
| PM-2 | 70 :9.0 | | | 9.1 | 3.2 |

EXAMPLE III

According to the process of example IA a great number of products having different maneb/zineb ratios were prepared. The results obtained with these products in the determinations and tests described in example I are shown in table C.

TABLE C

| Product | content % | yield % | maneb:zineb | decrease of content in % | |
|---|---|---|---|---|---|
| | | | | a | b |
| 1 | 90.0 | 94.5 | 70 : 5.5 | 5.3 | 2.5 |
| 2 | 90.2 | 94.9 | 70 : 5.9 | 6.7 | 3.7 |
| 3 | 90.0 | 95.0 | 70 : 6.8 | 6.7 | 3.2 |
| 4 | 88.7 | 91.4 | 70 : 7.5 | 6.8 | 2.0 |
| 5 | 90.0 | 94.5 | 70 : 8.2 | 6.8 | 2.6 |
| 6 | 88.4 | 92.8 | 70 : 8.8 | 5.0 | 2.1 |
| 7 | 89.5 | 94.1 | 70 : 9.3 | 7.0 | 2.4 |
| 8 | 90.8 | 95.3 | 70 : 9.9 | 6.0 | 2.4 |
| 9 | 86.8 | 92.0 | 70 : 10.4 | 7.5 | 2.0 |
| 10 | 85.2 | 89.0 | 70 : 10.8 | 7.6 | 2.3 |
| 11 | 90.3 | 92.9 | 70 : 11.3 | 7.2 | 3.1 |
| 12 | 89.8 | 91.7 | 70 : 12.5 | 7.7 | 3.2 |

All products appear to be very stable.

EXAMPLE IV.

A number of compositions were manufactured into 80 percent by weight spray dusts having the following composition:
- 80 percent by weight of active substance, calculated as 100%,
- 1 percent by weight of sodium dibutylnaphthalene sulfonate as a wetting agent,
- 3 percent by weight of lignine sulfonate as a dispersing agent, remainder a mixture of equal amounts by weight of ammonium sulfate and kaoline as an inert carrier.

These spray dusts were diluted with water to form a suspension containing 8.4 or 2 percent by weight of active substance (calculated as 100 percent) respectively. With the suspensions prepared in this way young tomato plants were sprayed to run-off. the phytotoxicity was determined according to the following method: Four ratings were used 0, 1, 2 and 3. 0 means that the plant is completely unaffected and 3 means that the plant is dead. In each case three plants on four times are rated. A maximum value is obtained for maximum phytotoxicity, namely for each of the three concentrations 3 × 3 (all plants dead) × 4 (rating times) = three times 36 = 108. The products of example I and PM—2 were compared with maneb and mancozela (a commercial manganese zinc product according to the U.S. Pat. specification No. 3,379,610).

The results are shown in table D.

Table D

| Composition | Concentration % by weight | | | |
|---|---|---|---|---|
| | 8 | 4 | 2 | total |
| Example IA | 8½ | 1 | 0 | 9½ |
| IB | 8½ | 1½ | 0 | 10 |
| IC | 8 | 1 | 0 | 9 |
| PM-2 | 10½ | 1½ | ½ | 12½ |
| maneb | 11 | 2½ | ½ | 14 |
| mancozela | 15 | 5 | 1 | 21 |

In table E the results of another series of similar tests have been indicated, which results have been obtained with the products of example I, the comparative products CP—1, CP—3 and CP—4 (CP—4 has been prepared in the same way as CP—2, but with 100 ml. of 1.8-molar zinc chloride solution in stead of with 180 ml. of 1 mole of zinc chloride solution), PM—1, maneb and mancozela.

Table E

| Composition | concentration % by weight | | | |
|---|---|---|---|---|
| | 8 | 4 | 2 | total |
| Example IA | 8 | 2½ | 1 | 11½ |
| IB | 8½ | 2½ | 1½ | 12½ |
| IC | 8 | 2 | 1 | 11 |
| CP-1 | 17 | 5 | 3½ | 25½ |
| CP-3 | 11 | 5½ | 4 | 20½ |
| CP-4 | 14½ | 4½ | 3 | 22 |
| PM-1 | 11 | 3 | 1½ | 15½ |
| maneb | 11½5 | 4 | 20½ | |
| Mancozeb | 17½ | 6½ | 4½ | 28½ |

It appears from the tables D and E that the products of the invention show the smallest phytotoxicity.

The products indicated in table C were tested in the same way with respect to their phytotoxicity, in which tests however three times the rating was determined, so that the maximum value is 81 (for each of the three concentrations 3 × 3 × 3). The results are indicated in table F.

Table F.

| Composition | concentration % by weight | | | total |
|---|---|---|---|---|
| | 8 | 4 | 2 | |
| 1 | 12 | 4½ | 2½ | 19 |
| 2 | 11 | 4½ | 2 | 17½ |
| 3 | 10 | 3½ | 1½ | 15 |
| 4 | 8½ | 2½ | 1 | 12 |
| 5 | 7 | 2 | 1½ | 10½ |
| 6 | 5 | 1½ | ½ | 7 |
| 7 | 4 | 2 | 0 | 6 |
| 8 | 4 | 2 | ½ | 6½ |
| 9 | 4½ | 2 | 1 | 7½ |
| 10 | 6 | 2½ | 1½ | 10 |
| 11 | 6½ | 2½ | 1½ | 10 |
| 12 | 8 | 2½ | 1½ | 12 |

It appears from table F that the phytotoxicity for a molar maneb/zineb ratio of 70/9 to 70/10 has the lowest value.

The fungicidal action of each of these compositions is substantially the same and is not less or something better than the fungicidal action of the known compositions. This is explained in example V.

EXAMPLE V.

Spray dusts prepared according to example IV were diluted with water to form suspensions containing 80, 40, 20, 10 or 5 ppm of active substance (calculated as 100 percent) respectively. With these suspensions young tomato plants were sprayed to run-off. After drying the plants were infected with *Phytophtora infestans*. After 7 days the numbers of diseased plants were determined. In the tables G and H the results of two series of tests have been indicated; therein the numbers represent the percentage of diseased plants.

Table G

| Composition | concentration of the suspension, ppm | | | | | |
|---|---|---|---|---|---|---|
| | 80 | 40 | 20 | 10 | 5 | 0 |
| blank | | | | | | 79 |
| Example IA | 10 | 23 | 35 | 49 | 59 | |
| IB | 10 | 23 | 36 | 47 | 58 | |
| IC | 9 | 21 | 33 | 47 | 55 | |
| CP-1 | 10 | 21 | 32 | 47 | 58 | |
| CP-3 | 13 | 26 | 35 | 54 | 61 | |
| CP-4 | 11 | 20 | 29 | 46 | 57 | |
| PM-1 | 13 | 27 | 38 | 56 | 64 | |
| maneb | 14 | 26 | 40 | 55 | 63 | |
| Mancozeb | 10 | 19 | 37 | 52 | 63 | |

Table H

| Composition | concentration of the suspension, ppm | | | | | |
|---|---|---|---|---|---|---|
| | 80 | 40 | 20 | 10 | 5 | 0 |
| blank | | | | | | 78 |
| Example IA | 11 | 25 | 41 | 49 | 57 | |
| IB | 12 | 25 | 43 | 50 | 57 | |
| IC | 11 | 25 | 39 | 47 | 53 | |
| PM-2 | 18 | 31 | 42 | 49 | 57 | |
| maneb | 10 | 33 | 47 | 53 | 63 | |
| Mancozeb | 10 | 33 | 46 | 55 | 63 | |

From the tables G and H it appears that the compositions prepared according to the invention have the same or even a better fungicidal action than the known compositions.

What we claim is:

1. The process which comprises reacting in aqueous medium 0.90 to 0.99 mole of water-soluble salt of manganese with one mole of water-soluble salt of ethylene bisdithiocarbamic acid to form a precipitate of manganese ethylenebisdithiocarbamate in aqueous suspension containing unreacted water-soluble salt of ethylene bisdithiocarbamic acid, contacting said suspension with 2 moles to 25 moles of a water-soluble salt of zinc per mole of the unreacted salt of ethylene bisdithiocarbamic acid to precipitate zinc ethylenebisdithiocarbamate, and separating the diprecipitate product of manganese and zinc ethylenebisdithiocarbamates from the aqueous medium.

2. The process according to claim 1 wherein there is 0.94 to 0.97 mole of the water-soluble salt of manganese.

3. The process according to claim 1 wherein thre is used 4 to 6 moles of the water-soluble salt of zinc.

4. The process according to claim 2 wherein there is used 4 to 6 moles of the water-soluble salt of zinc.

5. The process according to claim 1 wherein the water-soluble salt of ethylene bisdithiocarbamic acid is selected from the class consisting of the sodium salt and ammonium salt; the water-soluble salt of manganese is selected from the class consisting of the sulfate and chloride; and the water-soluble salt of zinc is selected from the class consisting of the sulfate and chloride.

6. The process according to claim 5 wherein there is 0.94 to 0.97 mole of the water-soluble salt of manganese.

7. The process according to claim 6 wherein there is used 4 to 6 moles of the water-soluble salt of zinc.

8. The fungicidal composition produced by the process of claim 1.

9. The process which comprises reacting in aqueous medium 0.90 to 0.99 mole of water-soluble salt of manganese with one mole of water-soluble salt of ethylene bisdithiocarbamic acid to form a precipitate of manganese ethylenebisdithiocarbamate in aqueous suspension, filtering the suspension to separate the precipitate from the aqueous medium filtrate containing unreacted water-soluble salt of ethylene bisdithiocarbamic acid, contacting said filtrate with 2 moles to 25 moles of a water-soluble salt of zinc per mole of the unreacted salt of ethylene bisdithiocarbamic acid to precipitate zinc ethylenebisdithiocarbamate and separating said precipitate from the aqueous medium, and mixing together the first and second precipitates to form a diprecipitate product of manganese and zinc ethylenebisdithiocarbamates.

10. The process according to claim 9 wherein there is 0.94 to 0.97 mole of the water-soluble salt of manganese.

11. The process according to claim 9 wherein there is used 4 to 6 moles of the water-soluble salt of zinc.

12. The process according to claim 10 wherein there is used 4 to 6 moles of the water-soluble salt of zinc.

13. The process according to claim 9 wherein the water-soluble salt of ethylene bisdithiocarbamic acid is selected from the class consisting of the sodium salt and ammonium salt; the water-soluble salt of manganese is selected from the class consisting of the sulfate and chloride; and the water-soluble salt of zinc is selected from the class consisting of the sulfate and chloride.

14. The process according to claim 13 wherein there is 0.94 to 0.97 mole of the water-soluble salt of manganese.

15. The process according to claim 14 wherein there is used 4 to 6 moles of the water-soluble salt of zinc.

16. The fungicidal composition produced by the process of claim 9.

* * * * *